US011772213B2

(12) United States Patent
Ogata et al.

(10) Patent No.: US 11,772,213 B2
(45) Date of Patent: Oct. 3, 2023

(54) TIGHTENING DEVICE

(71) Applicant: TOHNICHI MFG. CO., LTD., Tokyo (JP)

(72) Inventors: Tomohiro Ogata, Tokyo (JP); Kyoichi Komatsu, Tokyo (JP); Seiji Ito, Tokyo (JP)

(73) Assignee: TOHNICHI MFG.CO., LTD., Tokyo (JP)

( * ) Notice: Subject to any disclaimer, the term of this patent is extended or adjusted under 35 U.S.C. 154(b) by 600 days.

(21) Appl. No.: 17/048,719

(22) PCT Filed: May 15, 2019

(86) PCT No.: PCT/JP2019/019249
§ 371 (c)(1),
(2) Date: Oct. 19, 2020

(87) PCT Pub. No.: WO2020/121549
PCT Pub. Date: Jun. 18, 2020

(65) Prior Publication Data
US 2021/0146489 A1     May 20, 2021

(30) Foreign Application Priority Data
Dec. 11, 2018   (JP) .................. 2018-231251

(51) Int. Cl.
*B23P 19/06*     (2006.01)
*B25B 21/00*     (2006.01)
(Continued)

(52) U.S. Cl.
CPC ............ *B23P 19/066* (2013.01); *B25B 21/00* (2013.01); *B25B 23/147* (2013.01); *B25B 29/02* (2013.01); *F16B 31/04* (2013.01)

(58) Field of Classification Search
CPC ........ B25B 21/00; B25B 23/147; B25B 29/02; B23P 19/066; F16B 31/04
See application file for complete search history.

(56) References Cited

U.S. PATENT DOCUMENTS

| 5,295,295 A | 3/1994 | Aoyama |
| 5,837,907 A | 11/1998 | Ohmi et al. |

(Continued)

FOREIGN PATENT DOCUMENTS

| CN | 104668947 A | 6/2015 |
| CN | 105750897 A | 7/2016 |

(Continued)

OTHER PUBLICATIONS

PCT/IB/338, "Notification of Transmittal of Translation of the International Preliminary Report on Patentability for International Application No. PCT/JP2019/019249," dated Jun. 24, 2021.

(Continued)

*Primary Examiner* — Andrew M Tecco
*Assistant Examiner* — Nicholas E Igbokwe
(74) *Attorney, Agent, or Firm* — Manabu Kanesaka (57) ABSTRACT

Tightening device can fasten a fastening element by a target tightening force with good accuracy and facilitate automation. The tightening device includes a cylindrical drive socket holding a nut in the lower end opening thereof; a nut holder disposed inside the drive socket, a bolt passing through a bottom thereof, and regulating movement of the nut held by the drive socket toward the tip end of a threaded par; a tension rod which is disposed inside the nut holder and the lower end face of which has a threaded hole into which a portion of the threaded part that is further on the tip end side than the nut is screwed; a sensor for detecting tension force; a first motor for turning the tension rod around an axis (Continued)

that extends in the vertical direction; and a second motor for turning the drive socket around an axis.

2 Claims, 7 Drawing Sheets

(51) Int. Cl.
*B25B 23/147* (2006.01)
*B25B 29/02* (2006.01)
*F16B 31/04* (2006.01)

(56) References Cited

U.S. PATENT DOCUMENTS

| | | | |
|---|---|---|---|
| 6,421,902 B1* | 7/2002 | Loffler | F16B 31/043 29/709 |
| 7,595,601 B2 | 9/2009 | Kushida | |
| 8,375,554 B2* | 2/2013 | Wagner | B25B 29/02 29/525.11 |
| 8,539,656 B2 | 9/2013 | Katou et al. | |
| 9,339,926 B2 | 5/2016 | Kibblewhite | |
| 10,449,642 B2 | 10/2019 | Yamane et al. | |
| 2008/0251268 A1 | 10/2008 | Kushida | |
| 2010/0005663 A1* | 1/2010 | Monville | B25B 29/02 73/862.21 |
| 2011/0303720 A1 | 12/2011 | Beck et al. | |
| 2012/0153001 A1 | 6/2012 | Bertsch et al. | |
| 2017/0021478 A1* | 1/2017 | Junkers | F16B 39/24 |
| 2018/0141172 A1 | 5/2018 | Yamane et al. | |
| 2019/0120275 A1* | 4/2019 | Junkers | B25B 21/00 |
| 2020/0023477 A1* | 1/2020 | Hohmann | B25B 29/02 |

FOREIGN PATENT DOCUMENTS

| | | |
|---|---|---|
| CN | 207509110 U | 6/2018 |
| DE | 2328444 A1 | 1/1975 |
| EP | 2871027 A1 | 5/2015 |
| JP | S54-6317 B2 | 3/1979 |
| JP | S63-102879 A | 5/1988 |
| JP | H10-15752 A | 1/1998 |
| JP | 2003-240655 A | 8/2003 |
| JP | 2004-101246 A | 4/2004 |
| JP | 2008-151310 A | 7/2008 |
| JP | 4363661 B2 | 11/2009 |
| JP | 2011-125936 A | 6/2011 |
| TW | 206937 B | 6/1993 |
| TW | 330169 B | 4/1998 |
| TW | 201208825 A | 3/2012 |
| TW | 201231229 A | 8/2012 |
| TW | I369280 B | 8/2012 |
| TW | I595978 B | 8/2017 |

OTHER PUBLICATIONS

PCT/IB/373, "International Preliminary Report on Patentability for International Application No. PCT/JP2019/019249," dated Jun. 8, 2021.

PCT/ISA/237, "Written Opinion of the International Searching Authority for International Application No. PCT/JP2019/019249," dated Jul. 23, 2019.

PCT/ISA/210, "International Search Report for International Application No. PCT/JP2019/019249," dated Jul. 23, 2019.

Japan Patent Office, "Notice of Allowance for Japanese Patent Application No. 2018-231251," dated Jan. 29, 2019.

* cited by examiner

TIGHTENING DEVICE

RELATED APPLICATIONS

The present application is National Phase of International Application No. PCT/JP2019/019249 filed May 15, 2019, and claims priority from Japanese Application No. 2018-231251, filed Dec. 11, 2018, the disclosure of which is hereby incorporated by reference herein in its entirety.

TECHNICAL FIELD

The present invention relates to a tightening device.

BACKGROUND ART

A bolt/nut fastener (hereinafter referred to as fastener) is used to assemble and fix a large number of mechanical structures including an automobile as a representative example. When tightening force that tightens the fastener is lower than target tightening force, the fastener is likely to loosen, so that fatigue strength of the fastener decreases. It is therefore important from the viewpoint of safety to precisely tighten the fastener with the target tightening force.

The fastener is generally tightened in accordance with a torque method or a turn-of-nut method. The methods tend to cause variation in the tightening force, and the deviation from the target tightening force tends to be as large as ±20% to 50%. The size of the fastener therefore tends to be large enough to readily provide large tightening force, in other words, larger than necessary in consideration of safety. This leads to an increase in space where the fastener is disposed in a fastening target object and in turn increases in size and weight of the fastening target object.

In view of the problems described above, the present applicant has developed a tightening device described in Patent Literature 1 and capable of precisely tightening a fastener with target tightening force.

CITATION LIST

Patent Literature

Patent Literature 1: Japanese Patent No. 4,363,661

SUMMARY OF INVENTION

Technical Problem

The device described in Patent Literature 1 causes a female screw member to fit to a portion of a screw section of a bolt that is the portion closer to the front end of the screw section than a nut and rotates the female screw member in the tightening direction with the nut pressed by a nut pressing member from above. The device rotates the female screw member until the tensile force acting on the screw section reaches target tightening force.

The device subsequently rotates the female screw member and the nut simultaneously in the tightening direction to tighten the nut with the tensile force maintained. When the device determines based on the tensile force that acts on the screw section and is detected with a sensor that the tightening force that tightens the fastener via the bolt and the nut has reached the target tightening force, the device stops rotating the female screw member and the nut. The device can thus precisely tighten the fastener with the target tightening force.

In the device described above, drive force from a motor is transmitted only to the female screw member or to the female screw member and the nut via a planetary gear mechanism and a clutch. The device, however, requires operation of attaching and detaching a plurality of members to switch the destination to which the drive force is outputted from one to the other. A complicated mechanism is required to automatically attach and detach the members, and the device described above therefore has room for improvement from the viewpoint of automation.

An object of the present invention is to provide a tightening device that is readily automated.

Solution to Problem

To achieve the object described above, the invention of the present application relates to (1) a tightening device that tightens a nut on a screw section of a bolt inserted into a fastening target object, the nut tightening the fastening target object along with a head section of the bolt with tensile force acting on a portion of the screw section that is a portion closer to a front end of the screw section than the nut in such a way that a magnitude of tightening force acting on the fastening target object is equal to a magnitude of the tensile force, the tightening device including a drive socket that has a tubular shape and holds the nut at an opening in a lower end of the drive socket, a nut holder that has a bottomed tubular shape, is disposed inside the drive socket, and has a bottom section through which the bolt passes and which restricts movement of the nut held by the drive socket toward the front end of the screw section, a tension rod that is disposed inside the nut holder and has a lower end surface having a screw hole with which the portion of the screw section closer to the front end thereof than the nut engages, a sensor for detecting the tensile force, a first motor for rotating the tension rod around an axis thereof extending in an upward/downward direction, and a second motor for rotating the drive socket around the axis.

(2) The tightening device described in item (1) above, in which the first motor, the tension rod, the nut holder, and the drive socket are coaxially arranged, the second motor is located next to the first motor in a side-by-side fashion, and an outer circumferential section of the drive socket has a gear section to which drive force from the second motor is transmitted.

Advantageous Effect of Invention

According to the present invention, a tightening device that is readily automated can be provided.

BRIEF DESCRIPTION OF DRAWINGS

FIG. 2 FIGS. 2(A) to 2(C) show a temporary tightening process.

FIG. 3 FIGS. 3(D) and 3(E) show the temporary tightening process, and FIG. 3(F) shows a tensile force adding process.

FIG. 4 FIGS. 4(G) to 4(J) show a nut seating process with tensile force P added.

DESCRIPTION OF EMBODIMENT (Configuration of Tightening Device 10)

Figure 1:
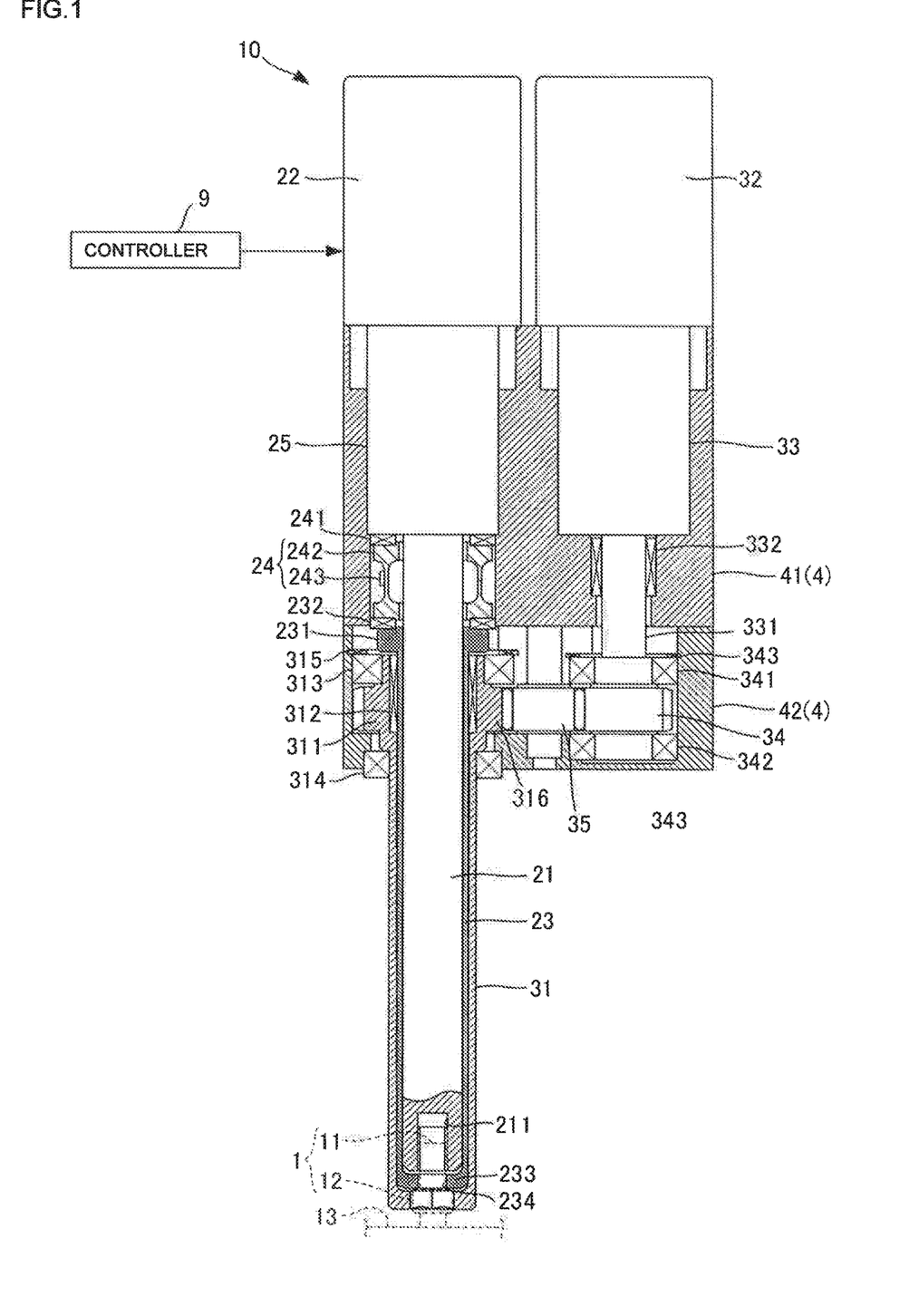
FIG. 1 is a cross-sectional view showing a tightening device.

FIG. 1 is a cross-sectional view showing a tightening device 10. The upward, downward, rightward, and leftward directions in the present specification refer to the upward, downward, rightward, and leftward directions in FIG. 1.

The tightening device 10 precisely and automatically tightens a bolt/nut fastener 1 with target tightening force. The bolt/nut fastener 1 includes a bolt 11, which is inserted into a hole in a fastening target object 13, and a nut 12, which engages with a screw section of the bolt 11. The nut 12 fastens, along with the head section of the bolt 11, the fastening target object 13. The bolt 11 may be a stud bolt. A female screw member that is in contact with the fastening target object 13 may engage with one end section of the stud bolt, and the nut 12 may engage with another end section of the stud bolt. The configuration of the tightening device 10 will be described below, and the process of tightening the bolt/nut fastener 1 carried out by the tightening device 10 will next be described.

An enclosure 4 of the tightening device 10 includes a body 41 and a recessed base 42, which is fixed to the lower surface of the body 41. A drive socket 31 for rotating the nut 12 protrudes beyond the lower surface of the enclosure 4.

The drive socket 31 has a cylindrical shape, is held rotatably around the axis of the cylindrical shape, and is fixed in the axial direction. A lower end opening of the drive socket 31 has a hexagonal or twelve-angled-polygonal shape that can hold the nut 12. The nut 12 is fit into the opening of the drive socket 31, and a second motor 32 drives the drive socket 31 to rotate the nut 12.

An upper section of the drive socket 31 is located in the base 42 and forms an expanded section 311, which is expanded in the radial direction. The expanded section 311 accommodates a bearing 312. The expanded section 311 is sandwiched between bearings 313 and 314 from above and below. The drive socket 31 is thus fixed in the axial direction. The bearings 313 and 314 hold the drive socket 31 rotatably around the axis thereof. A retaining ring 315 prevents the upper bearing 313 from falling off. A gear section 316, to which drive force is transmitted from the second motor 32, is provided around the outer circumference of the expanded section 311.

The second motor 32 is located in an upper section of the body 41 and attached to a position shifted from the drive socket 31 in the radial direction. The second motor 32 is located next to a first motor 22, which will be described later, in a side-by-side fashion.

A decelerator 33 is attached to the body 41 immediately below the second motor 32. The decelerator 33 decelerates the rotation inputted from the second motor 32 and outputs the decelerated rotation via an output shaft 331. The decelerator 33 is, for example, a two-stage planetary gear mechanism, and upper and lower internal gears are fixed to an inner portion of the body 41. The output from the second motor 32 is transmitted to a lower planetary carrier via an upper sun gear, a pair of upper planetary gears, an upper planetary carrier, a lower sun gear above the output shaft of the upper planetary carrier, and a pair of lower planetary gears in the decelerator 33 and outputted via the output shaft 331 of the lower planetary gear. The output shaft of the second motor 32, the output shaft of the upper planetary carrier, and the output shaft 331 of the lower planetary carrier are coaxially located. In the present specification, the state in which elements are coaxially located means that the center axes of the elements coincide with one another.

A pinion gear 34 is provided around a portion of the output shaft 331 that is the portion disposed in the base 42. In the base 42, an idle gear 35 is rotatably provided between the pinion gear 34 and the gear section 316 of the drive socket 31. The output from the second motor 32 is transmitted to the gear section 316 of the drive socket 31 via the decelerator 33, and the pinion gear 34 and the idle gear 35 of the decelerator 33 and rotates the drive socket 31. Upper and lower portions of the pinion gear 34 around the output shaft 331 are held by bearings 341 and 342. A retaining ring 343 prevents the upper bearing 342 from falling off.

A nut holder 23 has a bottomed cylindrical shape. The nut holder 23 is fit into the drive socket 31 and held by the drive socket 31 rotatably around the axis of the drive socket 31. An upper section of the nut holder 23 is held by the bearing 312. A flange 231, which is a spreading upper end of the nut holder 23, is supported by the expanded section 311, and the upper surface of the flange 231 is pressed by a sensor 24 via a thrust bearing 232.

The nut holder 23 has a bottom section 233 provided in a set position separate from the lower end of the drive socket 31 in the axial direction. A circular hole 234, through which the bolt 11 passes, is present at the center of the bottom section 233. In a pulling process of exerting tensile force on the screw section of the bolt 11, the bottom section 233 of the nut holder 23 restricts upward movement of the nut 12 (movement toward front end of screw section of bolt 11).

A tension rod 21 is an elongated component and has a columnar outer shape. The tension rod 21 is fit into the nut holder 23 and rotatable around the axis of the nut holder 23. The tension rod 21 is an output shaft of a decelerator 25, to which the output of the first motor 22 is inputted, and is fixed in the axial direction.

The tension rod 21, the nut holder 23, and the drive socket 31 are coaxially provided. A screw hole 211 is present at the center of the lower end surface of the tension rod 21. The screw section of the bolt 11 is fit into the screw hole 211. A portion of the screw section of the bolt 11 that is a portion closer to the front end thereof than the nut 12 is fit into the tension rod 21.

The first motor 22 is so attached to the upper portion of the body 41 as to be coaxial with the tension rod 21.

The decelerator 25 is attached immediately below the body 41. The decelerator 25 decelerates the rotation inputted from the first motor 22 and outputs the decelerated rotation via the tension rod 21. The decelerator 25 is, for example, a two-stage planetary gear mechanism, as is the decelerator 33. The output shaft of the first motor 22 is coaxial with the tension rod 21.

When the tension rod 21 is rotated in one direction with the bolt 11 fit into the tension rod 21, upward force (force toward front end of bolt 11 in axial direction) acts on the bolt 11. In the present specification, the one direction is referred to as a screwing direction, and the direction opposite the screwing direction is referred to as a loosening direction in some cases. In the pulling process, the tension rod 21 is rotated in the screwing direction with the nut holder 23 pressing the nut 12. The upward force thus acts on the bolt 11, whereby tensile force can be exerted on the screw section of the bolt 11.

The sensor 24 is intended to detect the tensile force exerted on the screw section of the bolt 11. The sensor 24 includes a straining element 242 and a strain gauge 243. The straining element 242 is made, for example, of metal and has a cylindrical shape having a reduced-thickness intermediate section. The straining element 242 is disposed outside the tension rod 21 in the radial direction and between the decelerator 25 and the nut holder 23. An upper portion of the straining element 242 is pressed by the decelerator 25 via a thrust bearing 241. A lower portion of the straining element 242 is supported by the nut holder 23 via the thrust bearing 232. The strain gauge 243 is attached to the intermediate section of the straining element 242.

In the pulling process, the straining element 242 receives upward force having the same magnitude as that of tensile force from the nut holder 23 and is therefore distorted in the compression direction within an elastic deformation range of the straining element 242. The strain gauge 243 changes in terms of resistance in accordance with the strain of the straining element 242 and changes output voltage to be outputted to the controller 9. The controller 9 calculates the tensile force acting on the screw section of the bolt 11 based on the amount of change in the output voltage from the strain gauge 243. The thrust bearings 241 and 232, which are provided on the upper and lower sides of the sensor 24, suppress transmission of undesirable turbulence other than the upward force from the nut holder 23 to the sensor 24. The sensor 24 can be any other appropriate sensor that can be used to detect the tensile force acting on the screw section of the bolt 11.

The controller 9 controls the first motor 22 and the second motor 32 independently of each other to, for example, tighten the bolt/nut fastener 1, which will be described later. The controller 9, specifically, for example, a CPU (central processing unit) reads and executes a program in a memory to carry out the tightening process. The controller 9 detects the rotational positions of the first motor 22 and the second motor 32 and feedback torque that is torque outputted from the second motor 32.

The first motor 22 and the second motor 32 are each, for example, a DC (direct current) servo motor. An encoder detects the rotational positions and speeds of the first motor 22 and the second motor 32 and outputs the detected results to the controller 9. Current values inputted to the first motor 22 and the second motor 32 are detected with current sensors and outputted from the current sensors to the controller 9. The current values inputted to the first motor 22 and the second motor 32 are proportional to the torque outputted from the first motor 22 and the second motor 32 and are therefore hereinafter referred to as the feedback torque. The feedback torque from the second motor 32 is used as a control parameter in a tightening process that will be described later. The first motor 22 and the second motor 32 may instead each be an AC (alternating current) motor. Sensors and circuits for acquiring parameters used to drive and control the first motor 22 and the second motor 32 can be appropriate ones.

The controller 9 displays, for example, a variety of setting values relating to the tightening of the bolt/nut fastener 1 on a display that is not shown. The controller 9 accepts input of the setting values and other pieces of information from a user via an input device that is not shown but is formed of buttons, keys, or a touch panel. The controller 9 receives electric power from an external power source (outlet) and supplies the first motor 22, the second motor 32, and other components with the electric power. In a case where the tightening device 10 is a cordless device in which the controller 9 is incorporated, the tightening device 10 may be provided with a battery.

(Description of Tightening Process)

The process of tightening the bolt/nut fastener 1 carried out by the tightening device 10 will be described below.

Figure 2:
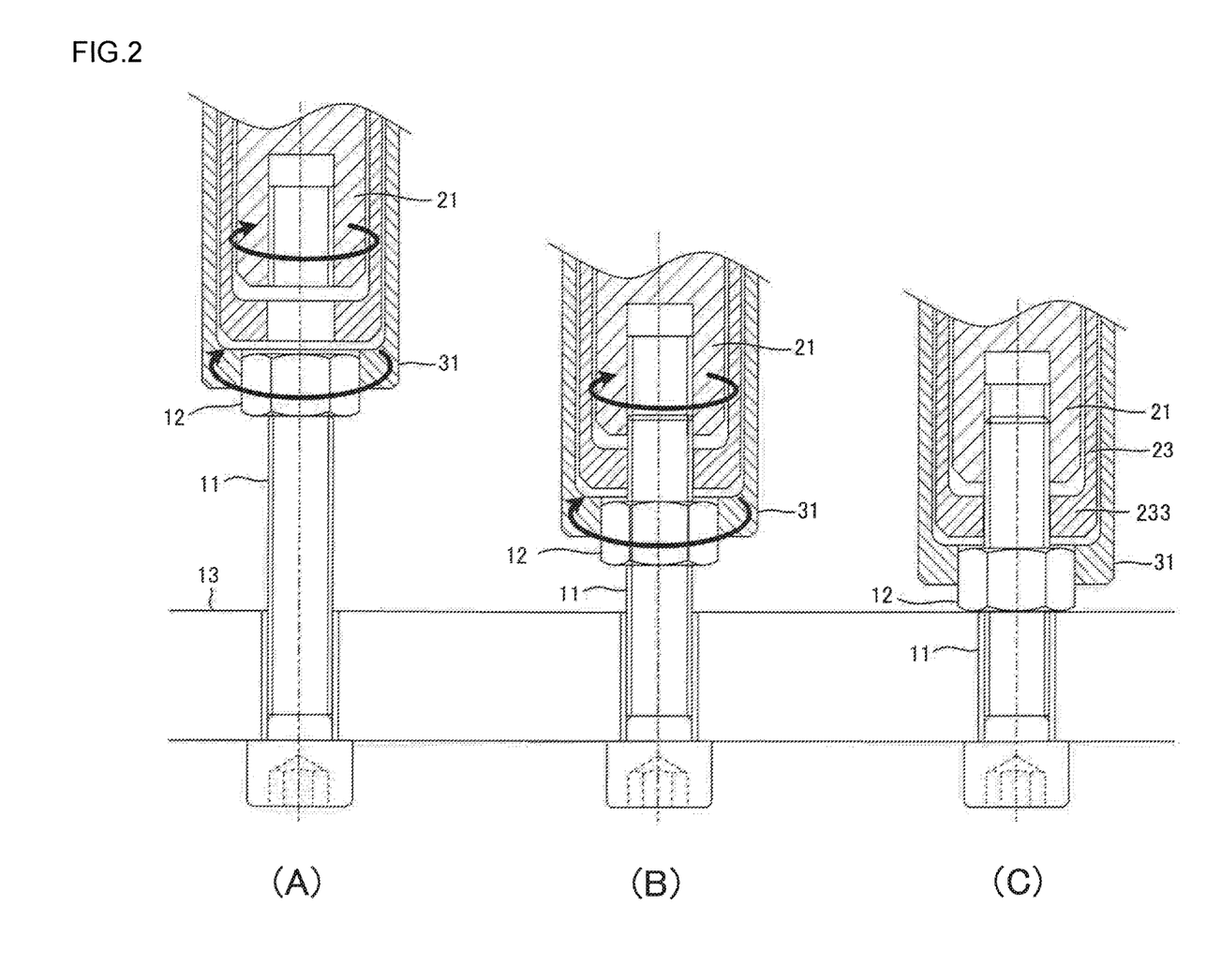

The user or any other operator first covers the front end of the bolt 11 with the nut 12 fit into the drive socket 31, as shown in FIG. 2(A). In this state, the controller 9 accepts a tightening process execution instruction from the user via the input device, which is not shown.

(Temporal Tightening Process)

The controller 9 first carries out the process of temporarily tightening the nut 12. The controller 9 simultaneously drives the first motor 22 and the second motor 32, as shown in FIGS. 2(A) and 2(B). The controller 9 thus rotates the drive socket 31 and the tension rod 21 in the screwing direction by the same number of revolutions in synchronous control. The female screw sections of the nut 12 and the tension rod 21 have the same screw pitch. The synchronous control of the drive socket 31 and the tension rod 21 therefore allows the drive socket 31 and the nut 12 to engage with the bolt 11 at the same time and by the same amount.

When the nut 12 is seated, as shown in FIG. 2(C), the force that is received by the second motor 32 and attempts to rotate the shaft of the second motor 32 abruptly increases, resulting in an abrupt increase in the feedback torque. When the controller 9 determines based on the feedback torque from the second motor 32 that the nut 12 has been seated, the controller 9 stops the operation of driving the first motor 22 and the second motor 32.

Figure 3:
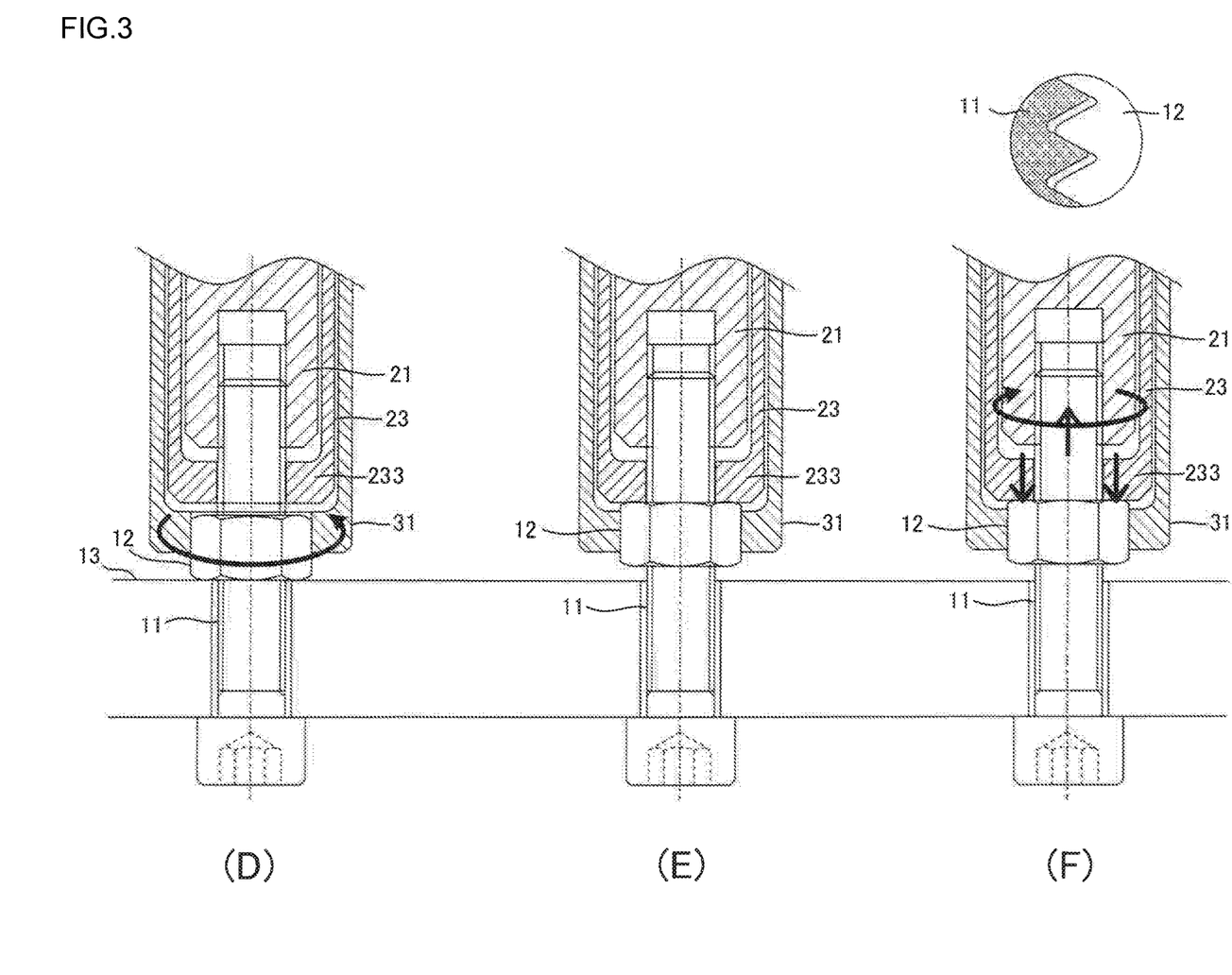

To eliminate the axial force acting on the bolt 11 in the pulling direction and produced when the nut 12 is seated, the controller 9 drives only the second motor 32, as shown in FIG. 3(D). The controller 9 drives the second motor 32 in the opposite direction to rotate the drive socket 31 in the loosening direction. The nut 12 therefore moves upward, separates from the fastening target object 13, and comes into contact with the bottom section 233 of the nut holder 23, as shown in FIG. 3(E). It is assumed that the amount of operation of driving the second motor 32 is a set amount.

(Process of Adding Tensile Force P)

The controller 9 subsequently carries out the process of adding tensile force P to the screw section of the bolt 11 (first step). The controller 9 drives only the first motor 22 with the nut 12 floating from the fastening target object 13 to rotate the tension rod 21 in the screwing direction, as shown in FIG. 3(F). Upward force thus acts on the bolt 11. In this process, the nut holder 23 restricts upward movement of the nut 12, and the nut 12 in turn restricts upward movement of the bolt 11.

The screw threads of the nut 12 press the screw threads of the bolt 11 to restrict upward movement of the bolt 11, as shown in the enlarged view in FIG. 3(F). The upward force acting on the screw section of the bolt 11 therefore acts as the tensile force P on the screw section of the bolt 11. The screw threads of the nut 12, which restrict upward movement of the screw threads of the bolt 11, are located on the lower side in the inter-screw-thread space of the bolt 11. Backlash therefore occurs between the upper surfaces of the screw threads of the nut 12 and the lower surfaces of the screw threads of the bolt 11.

The controller 9 drives the first motor 22 while monitoring the tensile force P with the sensor 24 until the controller 9 determines that the tensile force P becomes equal to target tightening force Fc. Having determined that the tensile force P becomes equal to the target tightening force Fc, the controller 9 stops the operation of the first motor 22. At this point, in practice, the tensile force P is excessive target tightening force Fc', which is greater than the target tightening force Fc, due to overshooting operation of the first motor 22. For example, when the target tightening force Fc is 10 kN, the operation of the first motor 22 is stopped when the tensile force P becomes 11 kN, which is the excessive target tightening force Fc'.

(Process of Seating Nut 12 with Tensile Force P Added)

Figure 4:
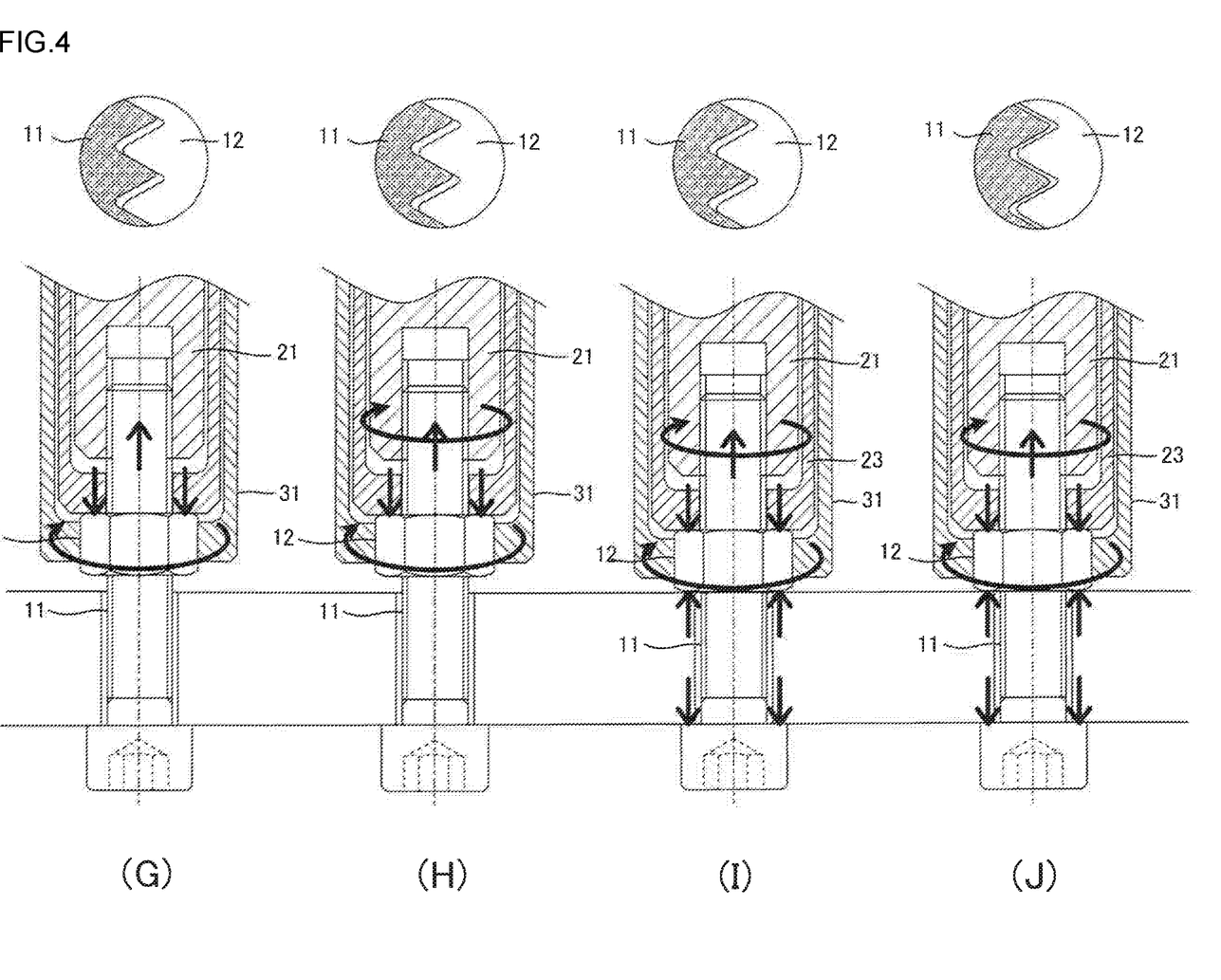

The controller 9 subsequently carries out the process of seating the nut 12 with the tensile force P added (second step). To achieve the situation in which the tensile force P acting on the screw section of the bolt 11 is the target tightening force Fc, the controller 9 first drives the second motor 32 to rotate only the drive socket 31 in the screwing direction, as shown in FIG. 4(G). The nut 12 thus moves downward, and the tensile force P decreases from the excessive target tightening force Fc'.

When the tensile force P decreases to the target tightening force Fc, the controller 9 also drives the first motor 22 to synchronously control the drive socket 31 and the tension rod 21, as shown in FIG. 4(H). The synchronous control causes the tension rod 21 and the nut 12 to approach the fastening target object 13 with the distance between the tension rod 21 and the nut 12 maintained. The tensile force P therefore does not decrease during the synchronous control.

Figure 6:
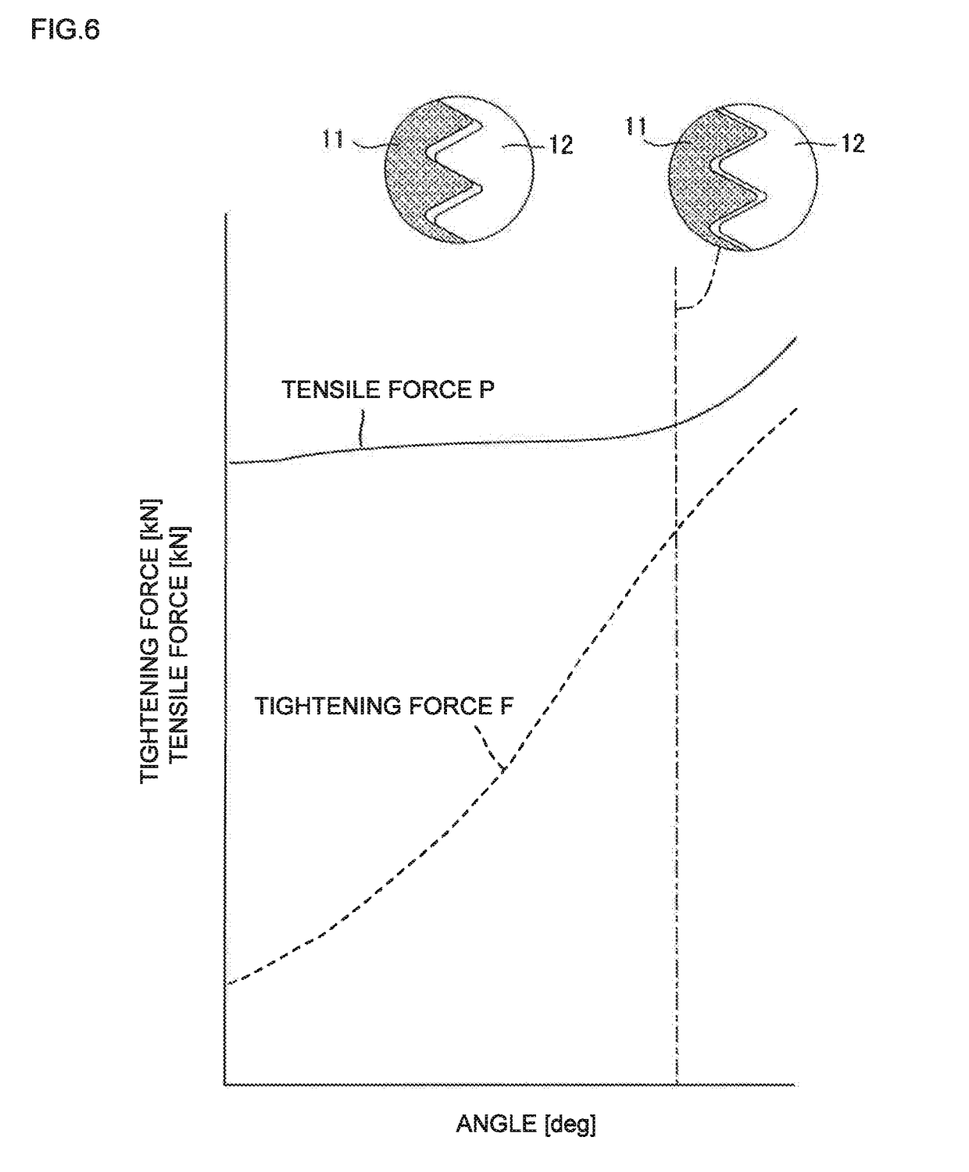
FIG. 6 shows the relationship between the tensile force produced when the seated nut is rotated along with a drive socket in a screwing direction and tightening force that tightens a bolt/nut fastener.

FIG. 6 shows the relationship between the tensile force P produced when the seated nut 12 is rotated along with the drive socket 31 in the screwing direction and the tightening force F, which tightens the bolt/nut fastener 1. It is noted that the controller 9 detects only the tensile force P but does not detect the tightening force F.

When the nut 12 is seated (FIG. 4(I)), the tightening force F is produced, and the tightening force F increases as the nut 12 is rotated in the tightening direction. When the tightening force F acting upward on the nut 12 (reaction force from fastening target object 13) increases to some extent as compared with the tensile force P acting downward on the nut 12 (reaction force from nut holder 23), the nut 12 starts moving upward relative to the bolt 11. That is, the screw threads of the nut 12 start moving upward, as shown in FIG. 4(J). Therefore, since the distance between the tension rod 21 and the nut 12 decreases, the tensile force P abruptly starts increasing (see FIG. 6).

Figure 5:
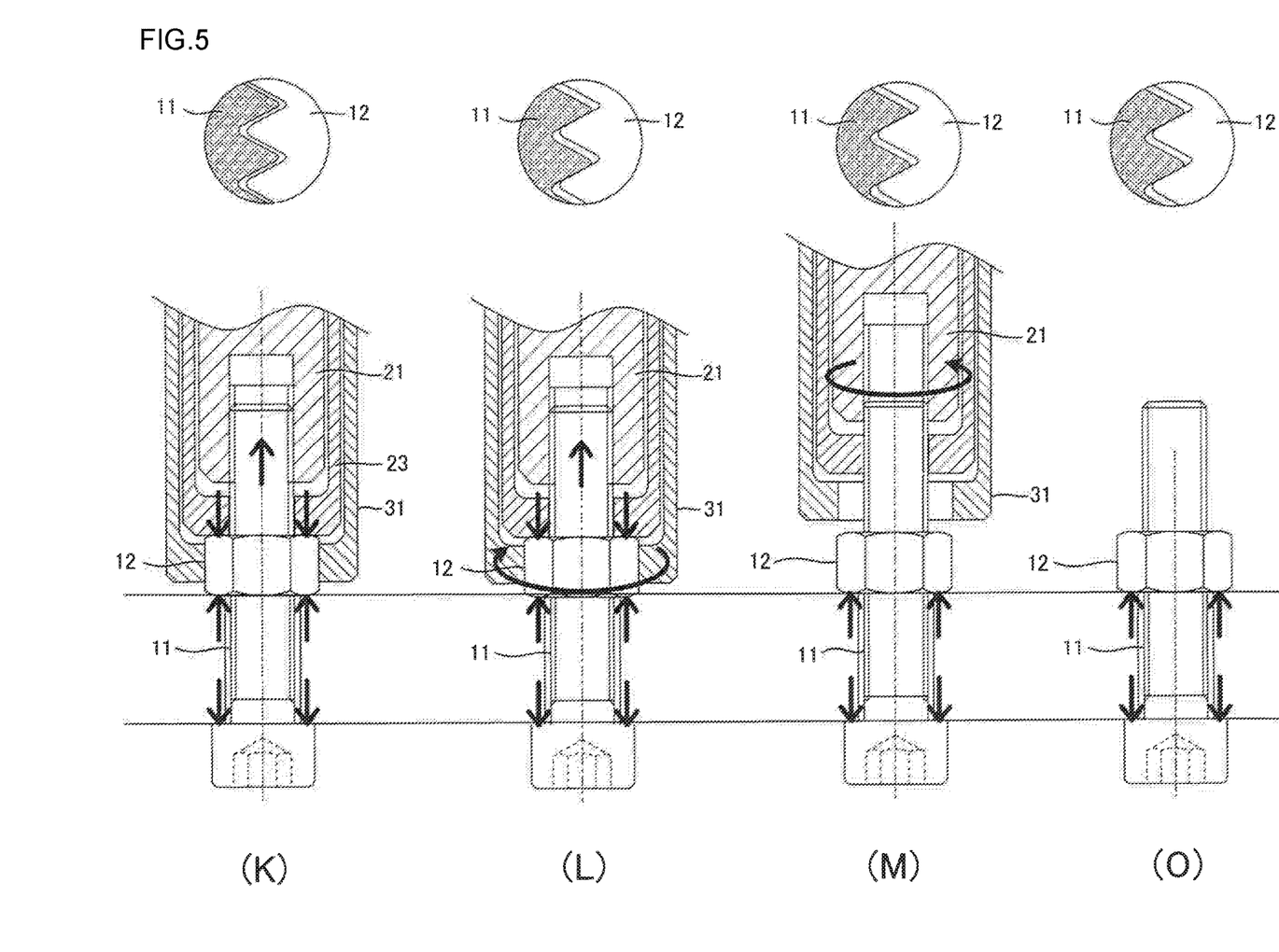
FIG. 5(K) shows the seating process.
FIG. 5(L) shows a final tightening process.
FIGS. 5(M) and 5(O) show the process of removing the tightening device.

When the controller 9 detects the abrupt increase in the tensile force P and determines based on the detected tensile force that the nut 12 has been seated and the tightening force F is equal to the target tightening force Fc, the controller 9 stops the operation of driving the first motor 22 and the second motor 32, as shown in FIG. 5(K). At this point, the screw threads of the nut 12 are located in positions separated from the screw threads of the bolt 11 that sandwich the screw threads of the nut 12 from above and below. To carry out a final tightening process as in the present embodiment, the determination is made at the point of time when the tightening force F is slightly smaller than the target tightening force Fc. The controller 9 may detect the abrupt increase in the tensile force P by determining that $dP/d\theta$ keeps falling within a fixed range or that $dP/d\theta$ becomes greater than a set value.

As described above, in the present process, after the tensile force P reaches the target tightening force Fc, the nut 12 is tightened, and the tightening is terminated when the tightening force F is equal to the target tightening force Fc (tensile force P). In the present embodiment, the bolt/nut fastener 1 can thus be precisely tightened with the target tightening force Fc.

However, removing the tension rod 21 from the bolt 11 in the state after the present process is terminated, the tensile force P acting downward on the nut 12 (reaction force from nut holder 23) disappears, and the upward tightening force F (reaction force from fastening target object 13) acts on the nut 12. Since there is a gap between each of the screw threads of the nut 12 and the corresponding screw thread of the bolt 11 located above the screw thread of the nut 12, the tightening force F undesirably moves the nut 12 upward by the amount corresponding to the gap. When the nut 12 moves upward, the tightening force F undesirably decreases from the target tightening force Fc.

(Final Tightening Process)

To address the problem described above, the controller 9 carries out a final tightening process of eliminating the gap between each of the screw threads of the nut 12 and the corresponding screw thread of the bolt 11 located above the screw thread of the nut 12. The controller 9 drives only the second motor 32 to rotate only the drive socket 31 in the screwing direction to tighten the nut 12, as shown in FIG. 5(L).

Figure 7:
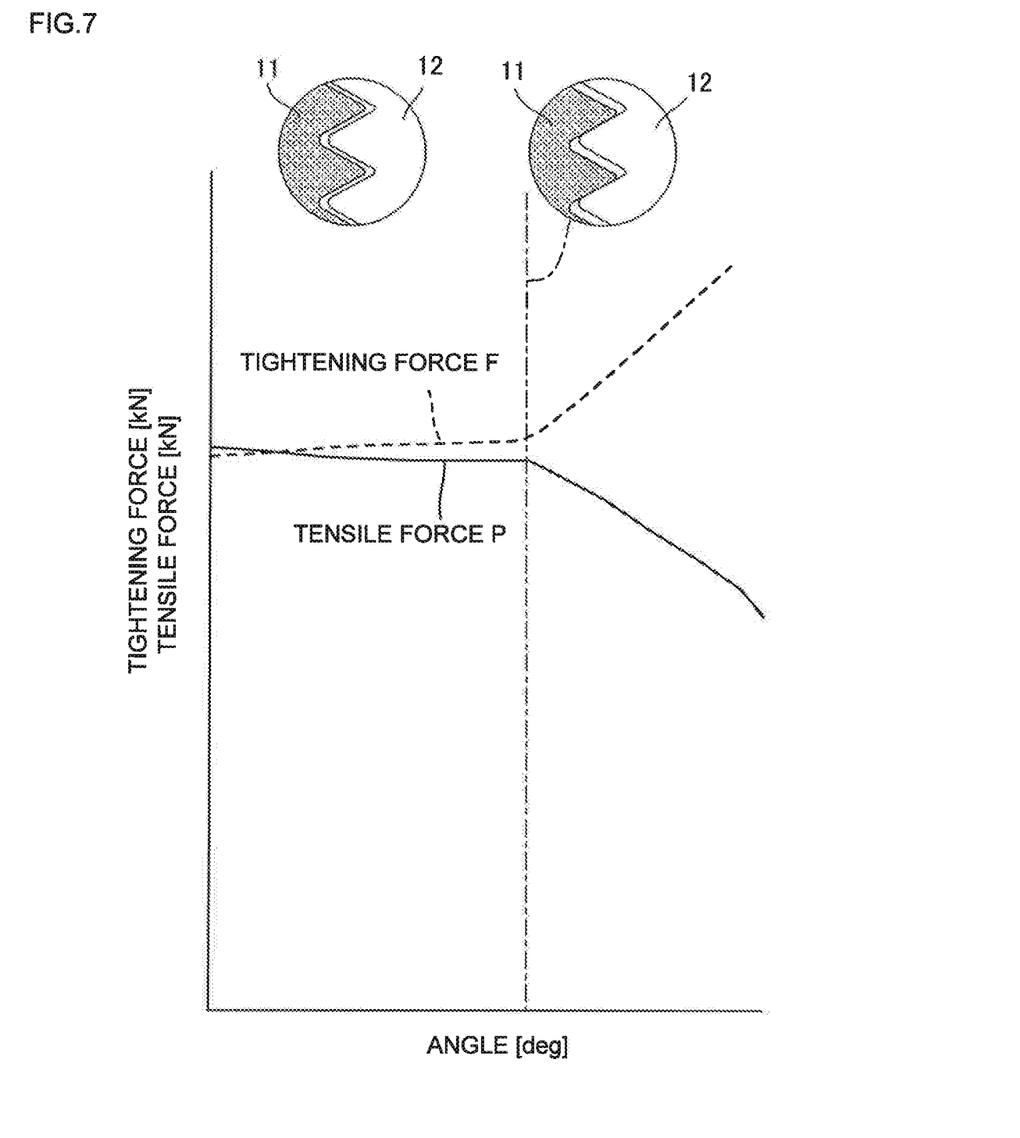
FIG. 7 shows the relationship between the tensile force and the tightening force in a case where only the nut is tightened starting from a state in which the tightening force becomes equal to target tightening force.

FIG. 7 shows the relationship between the tensile force P and the tightening force F in the case where only the nut 12 is tightened starting from the state in which the tightening force F becomes equal to the target tightening force Fc.

When only the nut 12 is tightened, the tightening force F increases, so that the screw threads of the nut 12 move upward relative to the screw threads of the bolt 11. During the period for which the screw threads of the nut 12 move upward so that the gaps between the screw threads of the bolt 11 and the screw threads of the nut 12 are reduced, the tensile force P and the tightening force F remain roughly fixed. In detail, the tightening force F slightly increases because the nut 12 is tightened although the amount of tightening is small. Further, since the distance between the tension rod 21 and the nut 12 increases although the amount of increase is small, the tensile force P acting on the bolt 11 decreases.

When the screw threads of the nut 12 move upward so that the gaps between the screw threads of the nut 12 and the screw threads of the bolt 11 disappear, and when the screw threads of the nut 12 come in intimate contact with the screw threads of the bolt 11, the screw threads of the nut 12 and the bolt 11 start being elastically deformed. The tightening force F becomes equal to the target tightening force Fc at the point of time when the elastic deformation starts. The point where it is determined that the operation of driving the tension rod 21 and the nut 12 is to be stopped in the preceding process of seating the nut 12 is so set as to achieve the state described above. When the elastic deformation starts, the distance between the nut 12 and the tension rod 21 starts increases, resulting in an abrupt decrease in the tensile force P. Further, the tightening force F abruptly increases. The controller 9 detects the abrupt decrease in the tensile force P and stops the operation of driving the second motor 32. The present process allows the screw threads of the nut 12 to be pressed by the screw threads of the bolt 11, which are above the screw threads of the nut 12, with the tightening force F roughly maintained at the target tightening force Fc.

(Removal of Tightening Device 10)

Finally, the controller 9 carries out the process of removing the tightening device 10. The controller 9 drives only the first motor 22, as shown in FIG. 5(M). The controller 9 drives the first motor 22 in the opposite direction to rotate the tension rod 21 in the loosening direction until the tension rod 21 is detached from the bolt 11. The tensile force P acting on the screw section of the bolt 11 is thus removed.

The removal of the tensile force P causes upward tightening force F (reaction force from fastening target object 13) to act on the nut 12. However, since the screw threads of the nut 12 are pressed from above by the screw threads of the bolt 11, the nut 12 does not move upward, and the tightening force F returns to the target tightening force Fc and is maintained at the target tightening force Fc because the increase in the tightening force due to the elastic deformation is eliminated.

The tightening process described above therefore allows the tightening device 10 to automatically tighten the bolt/nut fastener 1 with the target tightening force Fc. The user then removes the tightening device 10 from the bolt 11, as shown in FIG. 5(O).

(Effects)

In the present invention, rotating the tension rod 21 and the nut 12 with the nut holder 23 pressing the nut 12 allows the bolt/nut fastener 1 to be precisely tightened with the target tightening force. In the present invention, the bolt/nut fastener 1 can be tightened by driving and controlling the first and second motors 22, 32 for rotating the tension rod 21 and the nut 12 while monitoring the tensile force P detected with the sensor 24. The present invention therefore readily allows automated tightening.

In the present invention, in which the first motor 22, the tension rod 21, the nut holder 23, and the drive socket 31 are coaxially arranged, a compact tightening device 10 can be provided.

In the present invention, the controller 9 carries out the process of adding the tensile force P to the screw section of the bolt 11 (first step) as the process of tightening the bolt/nut fastener 1. In this process, the tension rod 21 is rotated in the tightening direction, in which the bolt 11 is tightened, with the nut 12 floating from the fastening target object 13 until the controller 9 determined that the tensile force P becomes equal to the target tightening force Fc. The controller 9 further carries out the process of seating the nut 12 (second step) as the tightening process. In this process, the controller 9 rotates the tension rod 21 and the nut 12 in the tightening direction with the tensile force Fc acting on the screw section of the bolt 11 until the controller 9 determines based on the detected tensile force P that the nut 12 is seated and the tightening force F becomes equal to the target tightening force Fc. Therefore, in the present invention, the bolt/nut fastener 1 can be automatically tightened with the tightening force F having a magnitude equal to that of the target tightening force Fc.

In the present invention, the controller 9 stops the operation of driving the first motor 22 when the tensile force P reaches the target tightening force Fc in the process of adding the tensile force P (first step). In this process, the tensile force P is the excessive target tightening force Fc' greater than the target tightening force Fc due to overshooting operation of the first motor 22. To address the situation, the controller 9 first rotates only the nut 12 in the process of seating the nut 12 (second step) and then starts rotating the tension rod 21 too when the controller 9 determines that the tensile force P decreases to the target tightening force Fc. As a result, in the present invention, correction of the tensile force P to the target tightening force Fc and the seating and tightening of the nut 12 can be continuously performed, whereby the tightening period can be shortened.

(Variations)

The bottom section 233 of the nut holder 23 may have any shape that allows the bottom section 233 to press the nut 12 from above and the bolt 11 to pass through the bottom section 233. The bottom section 233 may include, for example, a plurality of protrusions extending from the edge of the lower end opening of the nut holder 23 toward the vicinity of the center axis thereof.

(Example of Other Usage of Tightening Device 10)

In the embodiment described above, the tightening device 10 is used to newly tighten the bolt/nut fastener 1, but not necessarily in the present invention, and the tightening device 10 may be used, for example, to retighten the existing bolt/nut fastener 1 determined to have insufficient axial force in an axial force detection step. As in the embodiment described above, the tightening device 10 may exert tensile force having the same magnitude as that of the target tightening force Fc on the tightened bolt 11, rotate the tension rod 21 and the nut 12 in the tightening direction to cause the tightening force F to be roughly equal to the target tightening force Fc, and then carry out the final tightening process. For example, when bolts are successively fastened to a flange-shaped multi-axis workpiece (fastening target object), the axial force acting on a bolt fastened in an early stage of the fastening process decreases in some cases. In such cases, after the tightening device 10 fastens the bolt, the axial force acting on the bolt can be detected by pulling the bolt. An axial force detection theory is described in Japanese Patent No. 4,028,254 and will therefore not be described in detail. When it is determined that the axial force is insufficient as a result of the axial force detection, the tightening device 10 can perform retightening to manage the axial force with higher reliability. Moreover, a plurality of tightening devices 10 according to the present embodiment can be arranged (in the form of a matrix, for example) and simultaneously tighten a plurality of bolt/nut fasteners 1. For example, even in the case of a multi-axis workpiece, such as bolts for a cylinder head of an engine, the tightening devices 10 can perform simultaneous tightening, whereby stable axial force is provided across the entire product, resulting in improvement in the quality of the product.

The embodiment and variations described above have been presented only by way of example and should not be so interpreted as to limit the present invention. The structure and method in the embodiment and variations described above can accept addition and can be combined with each other in a variety of methods to provide an alternate configuration. The process of tightening the bolt/nut fastener 1 exemplified in the present specification includes a plurality of processes, and the number of processes can be greater or smaller than the number disclosed in the present specification. For example, carrying out a specific process before, simultaneously, or after a certain process falls within the disclosed scope of the present specification.

In the process of tightening the bolt/nut fastener 1 exemplified in the present specification, a step carried out by the user may be replaced with an automated step and this also falls within the disclosed scope of the present specification.

In the embodiment described above, in the process of tightening the bolt/nut fastener 1, the nut 12 is fastened to the bolt 11 with the tightening force F roughly equal to the target tightening force Fc, and the tension rod 21 is then removed. In this process, the final tightening process of tightening only the nut 12 is carried out to adjust the tightening force F to the target tightening force Fc and maintain the target tightening force Fc. However, in a case where the tightening device 10 is so configured that the tension rod 21 is left around the bolt 11, the final fastening process can be omitted. In this case, the tension rod 21 may be a pulling member having a female screw capable of adding tensile force to the bolt 11 and may be a cap-shaped member. In this case, the tightening force F is caused to be equal to the target tightening force Fc in the process of seating the nut 12. The aspect described above also falls within the disclosed scope of the present specification.

REFERENCE SIGNS LIST

9: Controller
10: Tightening device
11: Bolt
12: Nut
13: Fastening target object
21: Tension rod
22: First motor
23: Nut holder
31: Drive socket
32: Second motor
234: Screw hole
316: Gear section

The invention claimed is:

1. A tightening device that tightens a nut on a screw section of a bolt inserted into a fastening target object, the nut tightening the fastening target object along with a head section of the bolt with tensile force acting on a portion of the screw section that is a portion closer to a front end of the screw section than the nut in such a way that a magnitude of tightening force acting on the fastening target object is equal to a magnitude of the tensile force, the tightening device comprising:

a drive socket that has a tubular shape and holds the nut at an opening in a lower end of the drive socket;

a nut holder that has a bottomed tubular shape, is disposed inside the drive socket, and has a bottom section through which the bolt passes and which restricts movement of the nut held by the drive socket toward the front end of the screw section;

a tension rod that is disposed inside the nut holder and has a lower end surface having a screw hole with which the portion of the screw section closer to the front end thereof than the nut engages;

a sensor for detecting the tensile force;

a first motor for rotating the tension rod around an axis thereof extending in an upward/downward direction; and     a second motor for rotating the drive socket around the axis.

2. The tightening device according to claim 1, wherein the first motor, the tension rod, the nut holder, and the drive socket are coaxially arranged, the second motor is located next to the first motor in a side-by-side fashion, and an outer circumferential section of the drive socket has a gear section to which drive force from the second motor is transmitted.

\* \* \* \* \*